May 10, 1955
A. RONNING
2,708,011
BRAKE AND WHEEL COOLING MEANS
Filed May 25, 1951
5 Sheets-Sheet 1
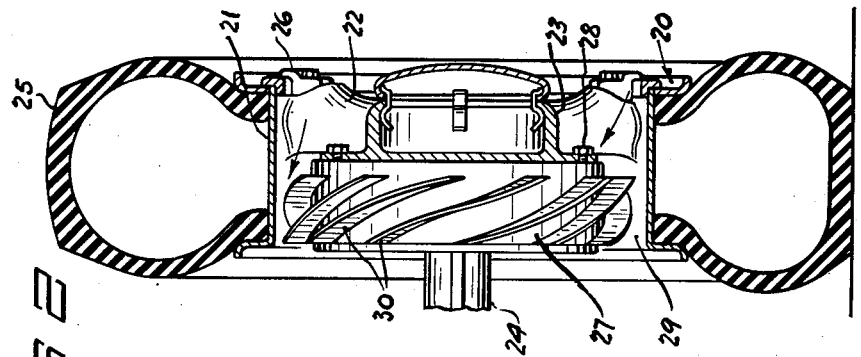
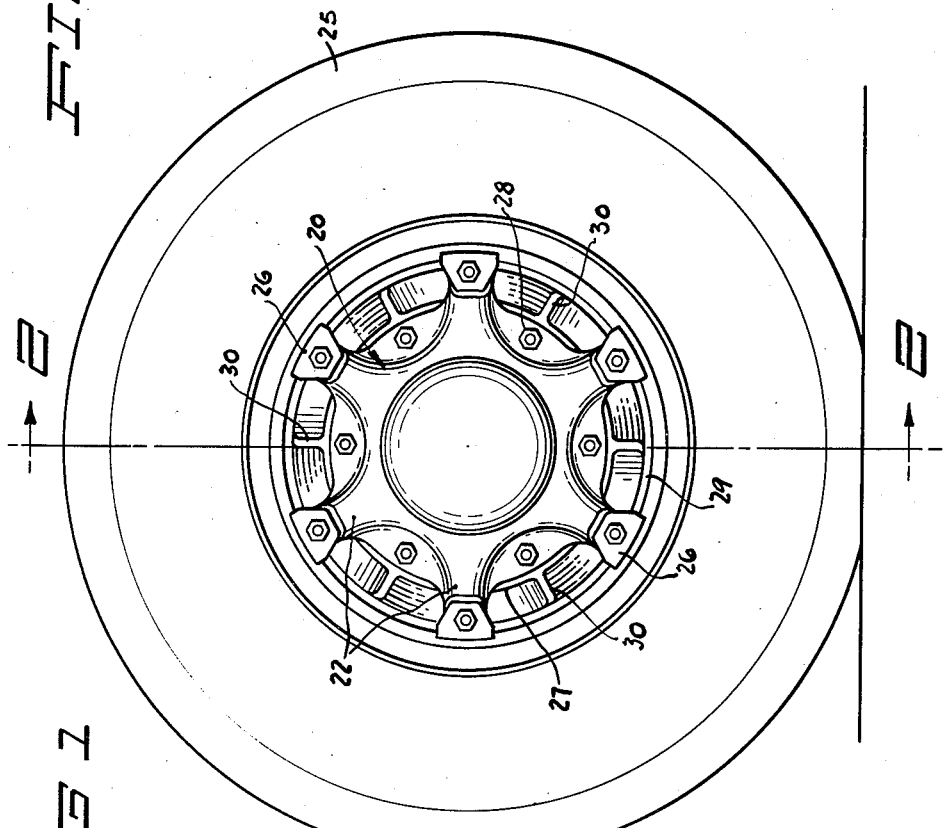
INVENTOR.
ADOLPH RONNING
BY
ATTORNEYS May 10, 1955 A. RONNING 2,708,011
BRAKE AND WHEEL COOLING MEANS
Filed May 25, 1951 5 Sheets-Sheet 2
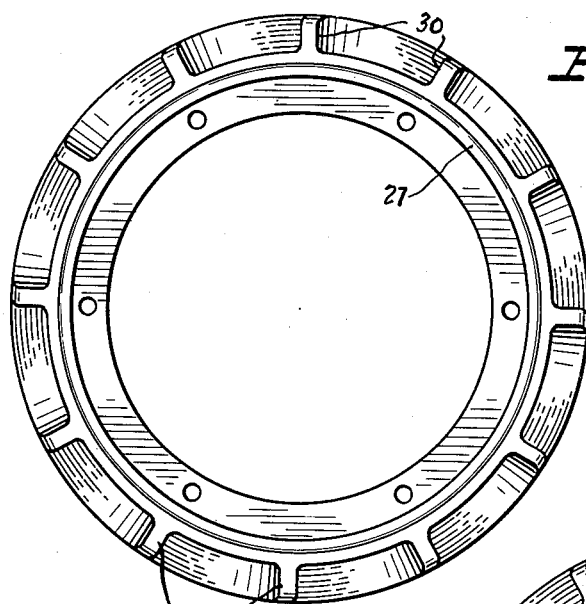
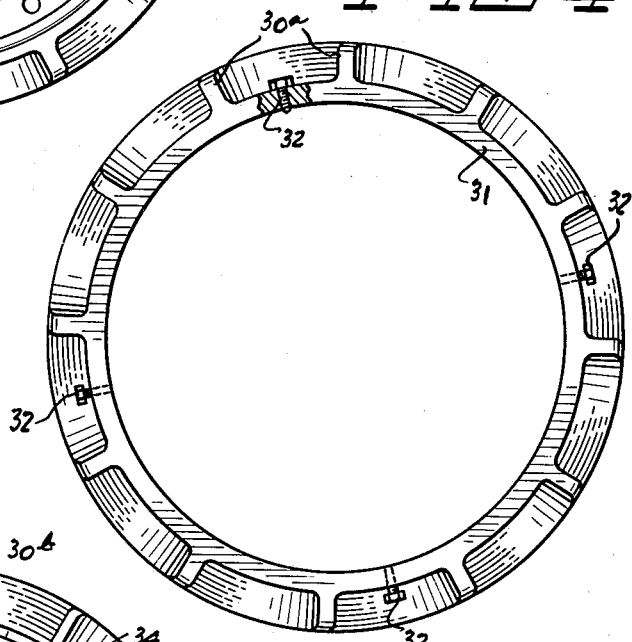
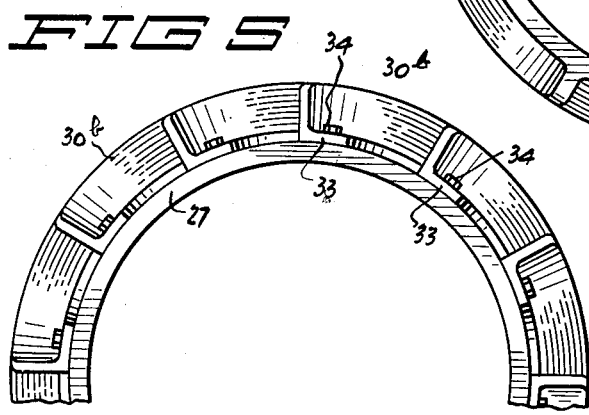
INVENTOR
ADOLPH RONNING
BY
ATTORNEYS

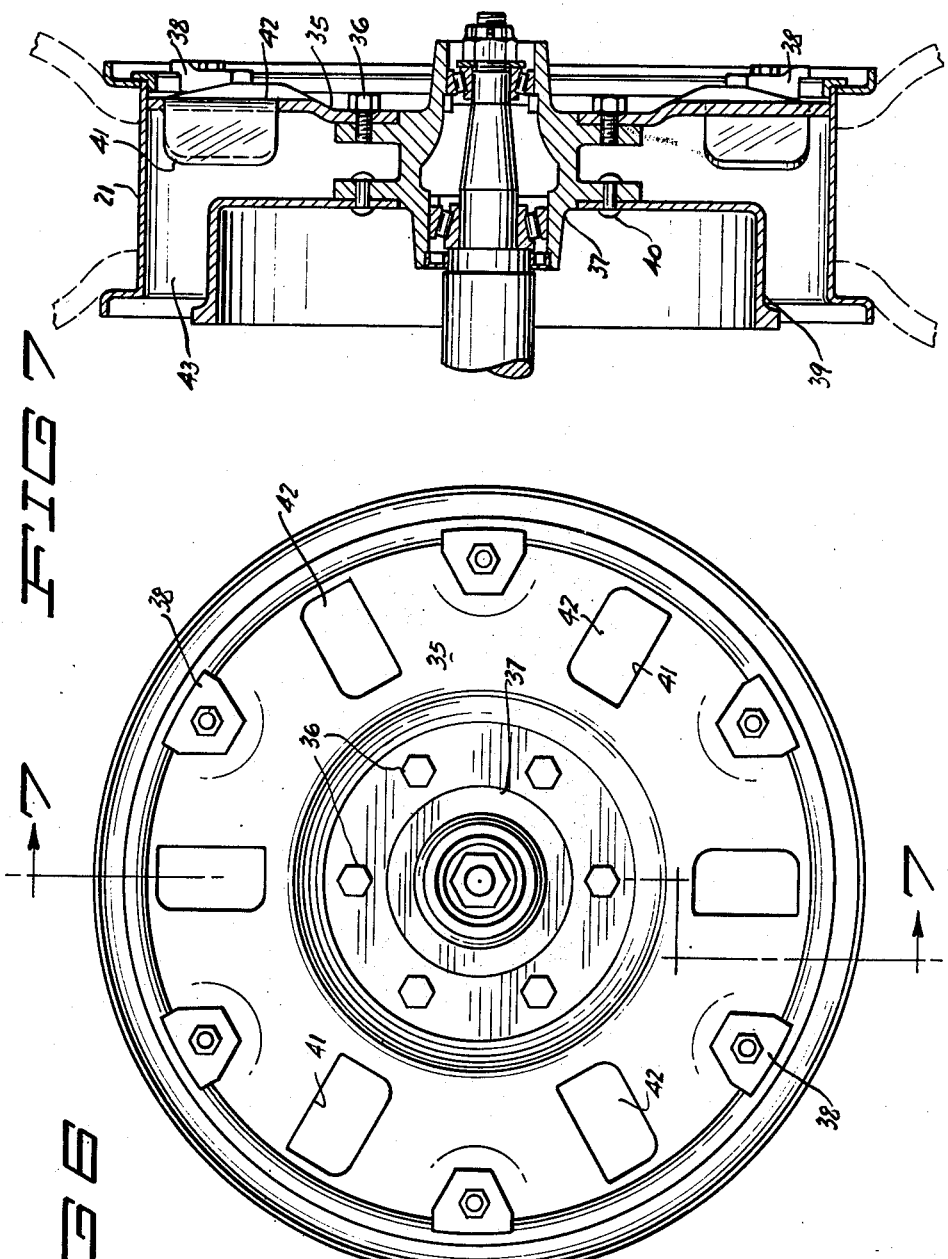

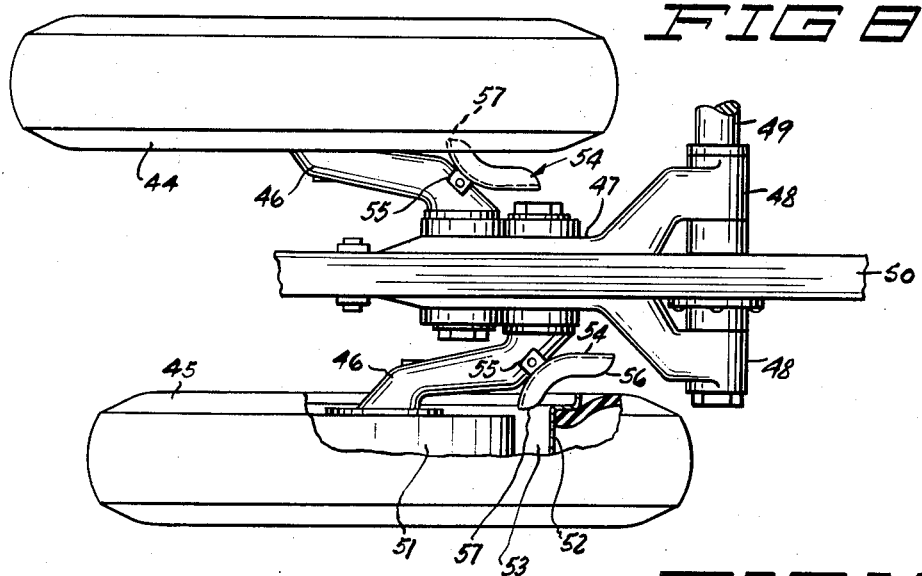
FIG 8
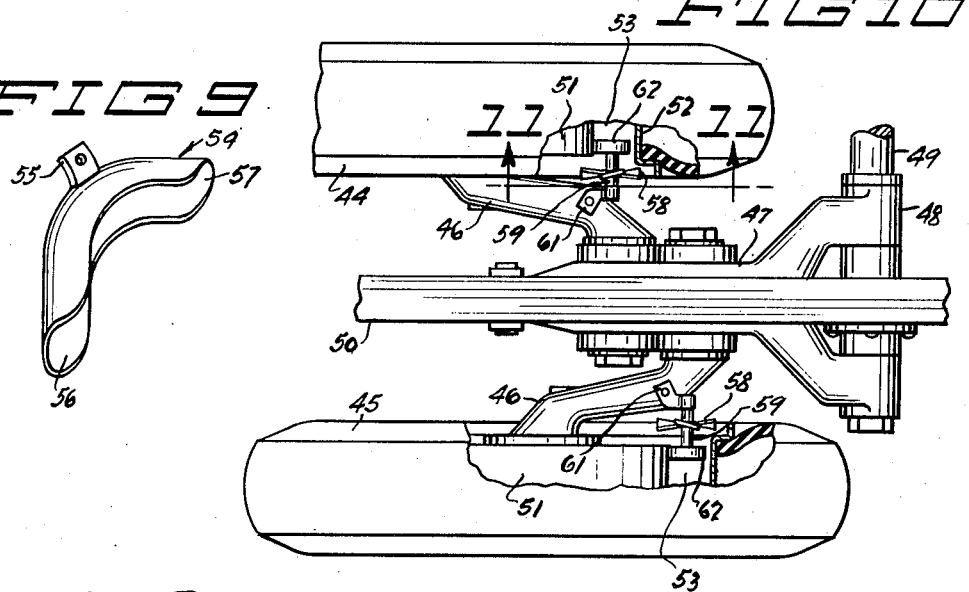
FIG 9
FIG 10
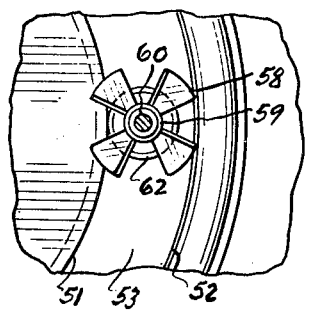
FIG 11
INVENTOR
ADOLPH RONNING
BY Carlsen & Hagle
ATTORNEYS May 10, 1955

A. RONNING 2,708,011

BRAKE AND WHEEL COOLING MEANS

Filed May 25, 1951

INVENTOR
ADOLPH RONNING

BY *Carlsen & Hagle*

ATTORNEYS

United States Patent Office 2,708,011
Patented May 10, 1955

2,708,011

BRAKE AND WHEEL COOLING MEANS

Adolph Ronning, Minneapolis, Minn.

Application May 25, 1951, Serial No. 228,227

3 Claims. (Cl. 188—264)

This invention relates generally to improvements in means or mechanisms for cooling the brake drums and other parts of vehicle wheels.

In the operation of heavy-duty and high speed vehicles, a great deal of heat is generated in the wheels, in the normal operation of the tires over the highway and particularly when the brakes are applied to halt the vehicle, and the primary object of this invention is to provide means to dissipate such heat and to cool the parts which are subjected to the greatest generation of heat during their operation.

In the ordinary brake-equipped vehicle wheel there appears to be an annular zone between the outside of the brake drum and inside of the tire rim in which the air is comparatively stagnant or in which the air travels without lateral dispersion, regardless of the speed at which the wheel is turned during operation of the vehicle. This theory is borne out by the well known fact that dust collects in this zone very rapidly and quite heavily. It follows, therefore, that this comparatively stagnant zone of air, aided and abetted by the insulating effect of the coating of dust upon the parts, will very seriously retard heat dissipation from the brake drum with the result that the drum and adjacent parts of the wheels become very hot, causing various undesirable effects presently known to those skilled in the art. It is accordingly an object of my invention to provide means for setting the air in this zone, within the wheel rim, in motion in a lateral direction so that the air will be constantly changed, which will not only draw in cooler air to facilitate heat absorption and dissipation but will prevent the collection of dust upon the parts and the resulting undesirable insulation thereof.

Another object of my invention is to provide air moving vanes or fins upon the brake drums themselves, so arranged as to draw in air at one side of the wheel and expel it at the other as the wheel rotates, and further to provide air moving means of this character which may be formed integrally with the drum or as a separate attachable mechanism for existing drums. Another object of my invention is to provide the wheel itself with air-propelling fans or blades operatively arranged to force air laterally through the zone between the drum and wheel rim. A further object is to provide for the same purpose air scoops which may be mounted upon any adjacent stationary portion of the vehicle so as to gather in air as the vehicle moves forwardly and direct the air laterally through the zone between the wheel rim and brake drum for the same purpose. A further object is to provide, as another modification, a small rotary fan or propeller operated off the brake drum, or other rotating portion of the wheel, and so associated therewith that the air currents generated by the fan will be directed through the critical zone of the associated part. Still a further object is to provide for the same purpose a stationarily supported baffle, or blade, which may be conveniently mounted as a part of the backing plate of the braking mechanism of the wheel and which extends either straight across or at an angle to the annular zone between the drum and wheel rim. Such baffle therefor will interrupt the continual orbital flow of stagnant heated air so that cool air will be continually drawn into this critical zone and the desired cooling effect obtained.

These and other more detailed and specific objects will be disclosed in the course of the following specification, reference being had to the accompanying drawings, in which—

Fig. 1 is an outside elevation of a heavy-duty vehicle wheel, the brake drum of which is provided with spirally arranged fins or vanes for setting the air in motion in the zone between the brake drum and wheel rim.

Fig. 2 is a diametric section along the line 2—2 in Fig. 1.

Fig. 3 is an enlarged inside elevational view of the brake drum of Figs. 1 and 2 as removed from the wheel, and illustrating the integral formation of the vanes or fins upon the drum.

Fig. 4 is an inside elevational view showing a separate attachable rim for present brake drums and with said rim provided with the cooling fins and means for securing the rim upon the drum.

Fig. 5 is a fragmentary inside elevational view of the peripheral rim portion of a brake drum and showing fins made up of separate pieces, with means for fastening these pieces in properly spaced relation upon the drum.

Fig. 6 is an enlarged outside elevational view of a vehicle wheel with the tire omitted and illustrating the application of the cooling fans or blades to the wheel itself.

Fig. 7 is a diametric sectional view along the line 7—7 in Fig. 6 and showing portions of the tire in dotted lines.

Fig. 8 is a plan view, upon a reduced scale and partially in section, of a differentially compensating wheel suspension according to one of my prior applications later to be identified and illustrating the application thereto of air scoops for drawing air laterally through the critical heating zone between the brake drum and wheel rim.

Fig. 9 is an enlarged perspective view of one of such air scoops alone.

Fig. 10 is a view similar to Fig. 8 but illustrating the application of rotary air propelling fans to the wheels with means for driving said fans off the rotating brake drums.

Fig. 11 is an enlarged fragmentary sectional view along the line 11—11 in Fig. 10.

Figure 12:
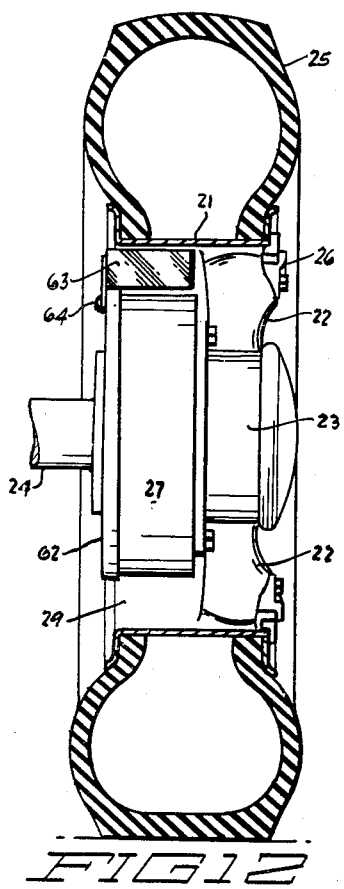
Fig. 12 is a diametric sectional view through a wheel similar to that shown in Fig. 2, but illustrating the application of a stationary blade or plate in the zone between the brake drum and wheel rim and showing this element as secured to the backing plate of the brake mechanism.

Referring now more particularly and by reference characters to the drawing, the first major embodiment of my invention as disclosed in Figs. 1 through 3 will be described. In Figs. 1 and 2 a more or less conventional, heavy-duty vehicle wheel is illustrated and designated generally at 20, and the same includes a wheel rim 21 which is supported by spokes 22 upon a hub structure 23 adapted to be carried by the axle or spindle appearing at 24 in Fig. 2. The wheel, of course, has the usual pneumatic tire 25, which is held in place by means of clamps 26, and located within the confines of the wheel rim 21 is a brake mechanism consisting of a brake drum 27 which is considerably narrower than the wheel rim and smaller in diameter. This drum is secured at 28 to the hub structure 23 to rotate therewith, and in the operation of the wheel, particularly when the brake shoes are applied within the drum, considerable heat is developed due to the braking friction, in addition to which the normal operation of the tire itself creates heat so that the air in the annular zone 29, between the brake drum and wheel rim, assumes a very high temperature, as is well known to those skilled in the art.

As stated hereinbefore, it appears that the air in this critical high temperature zone 29 is carried around in this stagnant condition inside the wheel rim and has very little tendency to move out at either side of the wheel so as to be replaced with cooler air to reduce the operating temperature of the parts. This assumption is borne out by the fact that the operation of these wheels over dusty roads results in a very heavy accumulation of dust on all adjacent surfaces of the critical annular zone 29, and this dust further contributes to the cooling problem in that it acts as an insulation to lateral heat dissipation.

In the form of wheel structures here disclosed, the spoked formation forms a plurality of openings, from one side of the wheel to the other, and in accordance with this embodiment of my invention I form upon the outer peripheral surface of the brake drum 27 a plurality of spiraled fins or vanes 30 of such dimension radially as to substantially clear the inner surface of the wheel rim 21 as clearly shown. It will at once be apparent that the rotation of the drum carrying these fins 30 will set up a pronounced motion of the air laterally of the wheel, pulling in fresh air from one side and ejecting heated air from the opposite side, as seen by the arrows in Fig. 2. Thus there is a continued travel and replacement of air through the critical zone 29 passing between the spokes of the wheel, and this air will travel in wiping contact with the brake drum so as to absorb and dissipate heat therefrom. Such a movement of the air will also materially assist in tire cooling, since the air flow will contact the wheel rim and adjacent parts, in addition to which the air flow will be of sufficient velocity to keep the parts clear of the insulating coating of dust which now accumulates to further enhance the cooling effect.

I have here shown the fins 30 as spaced approximately 30° apart and with each fin extending 60° around the wheel drum, but I do not, of course, limit myself to these precise proportions. In addition, it is entirely feasible to form fins, as designated at 30ª in Fig. 4, upon a separate ring or annulus 31, having an internal diameter such as to closely fit present day smooth brake drums, and to then provide this ring 31 with fastening means, such as the set screws shown at 32, for fastening of the part upon the drum. Such a structure may be cast of aluminum or other desirable like material in order to keep the weight at a minimum, and such materials also are desirable since they dissipate heat very rapidly.

Also as shown in Fig. 5, the spiral fins 30ᵇ may each be formed up from sheet metal in a separate piece, having a base flange 33 adapted to be cap screwed or otherwise suitably secured to the brake drum 27, as designated at 34.

As a second major embodiment of my invention I provide a structure, such as exemplified in Figs. 6 and 7, wherein the aforesaid wheel rim 21 is carried by a circular stamped or cast wheel disk 35, which is secured at 36 to a slightly different type of hub structure designated at 37. Here again the usual clamps 38 are provided to hold the tire upon the wheel and a conventional brake drum, such as designated at 39, is riveted or otherwise suitably secured at 40 to the hub structure, as best seen in Fig. 7. The precise details of this wheel structure are immaterial and my invention lies in the provision of air moving fans or blades 41 upon the wheel disk 35 in distinction to the provision previously described of the fins upon the brake drum itself. As here shown these fans 41 are punched in from the wheel disk 35 immediately within the wheel rim 21 and are angularly extended so as to force air through the resulting openings 42 in the wheel disk and blow the air through the annular critical zone 43, which here again exists between the brake drum and wheel rim. Thus this species of my invention provides the wheel itself with the means for moving the air and cooling the brake and wheel parts so that conventional brake assemblies may be employed.

As a third expression of my invention, references made to Figs. 8 and 9 wherein for convenience in disclosure I have shown a pair of differentially mounted wheels 44 and 45 forming part of the wheel suspension disclosed and claimed in my prior copending application for Compensating Wheel Suspension for Vehicles, Serial No. 601,030, filed June 22, 1945. In the portion of the wheel suspension shown the respective wheels 44 and 45 are journaled upon crank axles 46, the forward ends of which are in turn oscillatably mounted in a housing 47, pivoted at 48 to a cross shaft connection 49 carried from a portion 50 of the vehicle frame. Within such housing 47 the axles 46 are connected by meshing gears, so that as either wheel moves upward in rolling over an obstruction on the road surface the other moves downward by a corresponding amount. Also as shown in Fig. 8 the wheels have brake drums, one of which appears at 51, spaced inwardly from the adjacent wheel rim 52 so that there is formed the critical annular zone 53 through which, according to my present invention, I direct air for cooling the parts. In this embodiment of my invention the air flow or blast is created by air scoops 54 mounted in any suitable fashion, such as between lugs 55 on the crank axles 46, so as to remain in stationary relation to the respective wheels regardless of the compensating movements thereof. These scoops have open, forwardly directed ends 56 and are adapted to receive and gather air as the vehicle moves forwardly, and the scoops then curve rearwardly and outwardly to terminate in discharge ends 57 located immediately in line with the annular zones 53 so that the air flow will be directed laterally through said zone to cool the parts. It will, of course, be understood that air scoops of this general nature are applicable to other types of wheel mountings and suspensions and may be secured to any conveniently available portion of the vehicle in order to properly direct the air through the heated zone between the drum and wheel rim of each wheel.

In Figs. 10 and 11 I show still another embodiment of my invention and here again associated with the differential wheel suspension mechanism of my earlier application. The wheels and the corresponding suspension elements are accordingly referred to by the same reference numerals as applied in Fig. 8, but instead of the scoops 54 I here employ positive mechanism or means for directing the cooling air through the zone 53 between the wheel rims and brake drums. Such means consists of small bladed fans 58, the radial blades of which are secured to a spindle 59 rotating upon a shaft 60, carried in a bracket 61 suitably secured to the adjacent crank axle 46 of each wheel. The axis of rotation of each fan is aligned with the critical heating zone 53 referred to above and the spindle 59 is also provided with a small rubber or other resilient roller 62 disposed in running contact with the outer peripheral surface of the adjacent brake drum 51. Thus the rotation of the brake drum will drive the fan 58 through the roller 62 and the fan blades are so pitched as to direct a positive air blast through the zone 53 to cool the drum and adjacent parts of the wheel.

As a fifth and final embodiment of my invention I disclose in Figs. 12 through 15 the application to a wheel structure, such as that shown in Figs. 1 and 2, of possibly the simplest means for moving and changing the air in these critical zones between the brake drum and wheel rim. Since the wheel structure, per se, is identical with that shown in Figs. 1 and 2 the same reference numerals are applied throughout, but it will be noted in this case that the conventional stationary supported backing plate, with which all present brake mechanisms are provided, is shown at 62 at the inner side of the brake drum 27. In this case also the brake drum 27 is smooth upon its outer periphery and this represents then the conventional wheel assembly wherein there is a pronounced tendency for the air in the zone 29 to remain stagnant so as to not only permit the brake and wheel parts to assume high operating temperatures, but to develop the insulating coating of dust previously mentioned herein. In accordance with my invention, as expressed in these drawings, I provide a stationary baffle or plate 63 preferably, although not necessarily, of rectangular shape and sized to quite closely fit the zone 29 but clear the rotating brake drum 27 and wheel rim 21. This baffle 63 is then secured to any convenient adjacent non-rotating part of the vehicle and may be very conveniently secured to the backing plate 62 by forming the baffle with a flange 64 to be riveted or otherwise secured to said plate. It will, of course, be practical to weld or otherwise secure the baffle to the back plate, but however mounted the baffle 63 thus forms an obstruction to the continual orbital travel of the stagnant air in the zone 29, so that this air is expelled from the zone. It necessarily follows that the expelled air will be replaced with fresh air so that there will be a continuous heat exchanging action of the air to cool the parts and sufficient turbulence will be developed to prevent an accumulation of dust.

Figure 13:
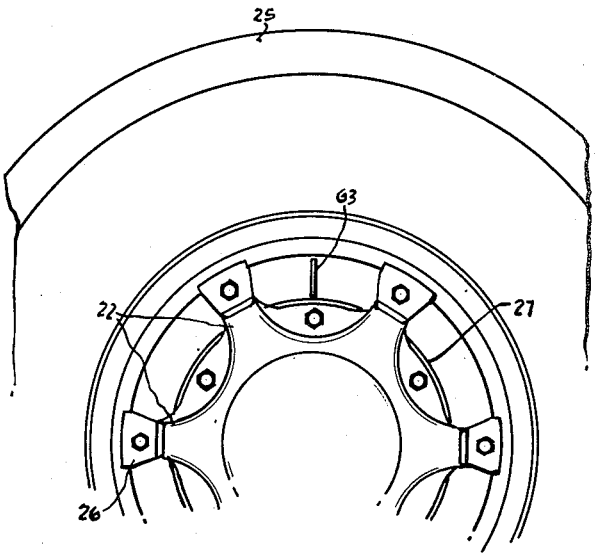
Fig. 13 is a fragmentary outside elevational view similar to Fig. 1 and showing the location of the stationary air flow plate or blade of Fig. 12.
Figure 15:
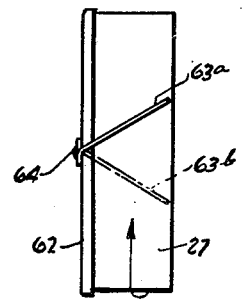
Fig. 15 is a similar view but showing how the air flow plate or blade may be angled with reference to the direction of rotation of the brake drum.
Figure 14:
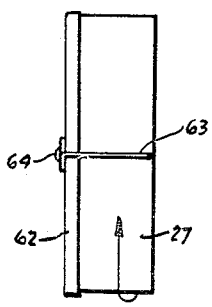
Fig. 14 is a somewhat diagrammatic showing in plan view of the brake drum and backing plate, with the plate or blade of Figs. 12 and 13 secured to the latter.

In Figs. 12 through 14 the baffle 63 is shown as positioned at right angles to the direction of rotation of the wheel drum, but as seen in Fig. 15 the baffle may be angled either in the direction of travel, as seen at 63ª, or in opposition to the direction of travel, as shown by the dotted lines 63ᵇ. However the baffle is positioned, it will undoubtedly create the necessary interruption to the travel of the air around within the wheel and set up turbulence sufficient to bring about the desired cooling effect.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle having a frame and a rotating wheel thereon, said wheel having a rim and therewithin a brake drum, means for blowing cooling air between the drum and rim comprising a rotary fan separate from the drum, means rotatably supporting the fan on the frame adjacent the wheel and in line with the space between the wheel rim and brake drum, and means engaged with the brake drum for rotating the fan.

2. In a vehicle having a frame and a rotating wheel thereon, said wheel having a rim and therewithin a brake drum, means for blowing cooling air between the wheel rim and brake drum comprising a fan rotatably supported on the frame, and a roller connected to the fan and engaging the drum as it rotates to drive the fan.

3. The combination with a vehicle wheel having cooperating relatively stationary and rotating brake elements, of a rotary fan having a shaft and located in immediate proximity to the wheel but separate therefrom and in position for directing a cooling air current over said brake elements, and an operating means on said shaft rotatably engaging said rotating element to rotate the fan.

References Cited in the file of this patent
UNITED STATES PATENTS

| | | |
|---|---|---|
| 1,906,520 | Bode | May 2, 1933 |
| 1,971,929 | Burdick | Aug. 28, 1934 |
| 2,105,176 | Ash | Jan. 11, 1938 |
| 2,106,702 | Campbell | Feb. 1, 1938 |
| 2,136,472 | Sinclair | Nov. 15, 1938 |
| 2,237,164 | Rosenberg | Apr. 1, 1941 |
| 2,265,938 | Eksergian | Dec. 9, 1941 |
| 2,563,769 | Wyant | Aug. 7, 1951 |

FOREIGN PATENTS

| | | |
|---|---|---|
| 991,425 | France | June 20, 1951 |